US007524919B2

(12) United States Patent
Hoover et al.

(10) Patent No.: US 7,524,919 B2
(45) Date of Patent: Apr. 28, 2009

(54) POLYCARBONATE-POLYSILOXANE COPOLYMERS, METHOD OF MAKING, AND ARTICLES FORMED THEREFROM

(75) Inventors: James Franklin Hoover, Evansville, IN (US); Jan-Pleun Lens, Breda (NL); Brian Mullen, Mt. Vernon, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 168 days.

(21) Appl. No.: 11/537,135

(22) Filed: Sep. 29, 2006

(65) Prior Publication Data
US 2008/0081893 A1  Apr. 3, 2008

(51) Int. Cl.
*C08G 64/00* (2006.01)
*C08G 63/02* (2006.01)
(52) U.S. Cl. ............... 528/196; 264/176.1; 264/219; 428/411.1; 428/412; 525/439; 525/462; 525/464; 528/25; 528/29; 528/198
(58) Field of Classification Search ............... 264/176.1, 264/219; 428/411, 412; 525/439, 462, 464; 528/25, 29, 196, 198
See application file for complete search history.

(56) References Cited

U.S. PATENT DOCUMENTS

| 4,180,651 | A | 12/1979 | Mark |
| 4,518,747 | A * | 5/1985 | Stix et al. ............ 525/462 |
| 4,900,785 | A | 2/1990 | Leitz et al. |
| 4,918,149 | A | 4/1990 | Clagett et al. |
| 5,025,055 | A | 6/1991 | Hamersma et al. |
| 5,455,310 | A | 10/1995 | Hoover et al. |
| 5,530,083 | A | 6/1996 | Phelps et al. |
| 6,072,011 | A | 6/2000 | Hoover |
| 6,265,522 | B1 | 7/2001 | Brunell et al. |
| 6,294,647 | B1 | 9/2001 | Brunell et al. |
| 6,492,481 | B1 * | 12/2002 | Davis et al. ............ 528/29 |
| 6,538,065 | B1 | 3/2003 | Suriano et al. |

(Continued)

FOREIGN PATENT DOCUMENTS

| EP | 537577 A1 | 4/1993 |
| EP | 0524731 B1 | 7/1993 |
| EP | 0500131 B1 | 10/2001 |
| EP | 1757634 | 2/2007 |
| WO | 2004076512 | 9/2004 |
| WO | 2004076512 A2 | 9/2004 |
| WO | 2005055236 | 6/2005 |
| WO | 2005113638 | 12/2005 |

OTHER PUBLICATIONS

Written Opinion for International Search Report PCT/US2007/074969, Mailed Jan. 25, 2008, 6 pages.

International Search Report PCT/US2007/074969, Mailed Jan. 25, 2008, 5 pages.

*Primary Examiner*—Terressa M Boykin

(57) ABSTRACT

A polycarbonate copolymer comprising 90 to 100 mol % of units derived from a cyclohexylidene bisphenol of the formula

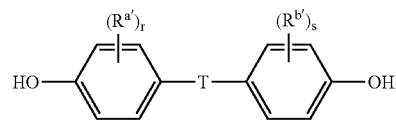

wherein $R^{a'}$ and $R^{b'}$ are each independently $C_{1-12}$ alkyl, T is a $C_{5-16}$ cycloalkylene, a $C_{5-16}$ cylcloalkylidene, a $C_{1-5}$ alkylene, a $C_{1-5}$ alkylidene, a $C_{6-13}$ arylene, a $C_{7-12}$ arylalkylene, $C_{7-12}$ arylalkylidene, a $C_{7-12}$ alkylarylene, or a $C_{7-12}$ arylenealkyl, and r and s are each independently 1 to 4;

2 to 35 wt % of units derived from a polysiloxane diol of the formulas

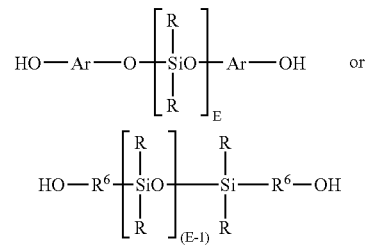

or a combination thereof, wherein Ar is a substituted or unsubstituted $C_{6-36}$ arylene group, each R is the same or different $C_{1-13}$ monovalent organic group, each $R^6$ is the same or different divalent $C_1-C_{30}$ organic group, and E is an integer from 2 to 100; and 0 to 10 mol % of units derived from a dihydroxy aromatic compound of formula (3)

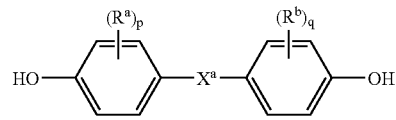

wherein $R^a$ and $R^b$ are each independently halogen, p and q are each independently integers of 0 to 4, and the dihydroxy aromatic compound of formula (3) is not the same as the cyclohexylidene bisphenol or the polysiloxane diols.

26 Claims, No Drawings

U.S. PATENT DOCUMENTS

| | | |
|---|---|---|
| 6,559,270 B1 | 5/2003 | Siclovan et al. |
| 6,780,956 B2 | 8/2004 | Davis |
| 6,833,422 B2 | 12/2004 | Silva et al. |
| 6,861,482 B2 | 3/2005 | Brunell et al. |
| 6,870,013 B2 * | 3/2005 | Silva et al. .................. 525/464 |
| 7,323,536 B2 * | 1/2008 | Mullen et al. ............... 528/196 |
| 2003/0065122 A1 | 4/2003 | Davis |
| 2004/0039145 A1 | 2/2004 | Silva et al. |
| 2004/0220330 A1 | 11/2004 | DeRudder et al. |
| 2005/0032988 A1 | 2/2005 | Silva et al. |
| 2005/0137310 A1 | 6/2005 | Gupta et al. |
| 2006/0002814 A1 | 1/2006 | Chatterjee et al. |
| 2006/0074156 A1 | 4/2006 | Ebeling et al. |

* cited by examiner

POLYCARBONATE-POLYSILOXANE COPOLYMERS, METHOD OF MAKING, AND ARTICLES FORMED THEREFROM

BACKGROUND

This disclosure relates to polycarbonates, and in particular to polycarbonate-polysiloxane copolymers, methods of manufacture, and uses thereof.

Polycarbonates are useful in the manufacture of articles and components for a wide range of applications, from automotive parts to medical devices. Polycarbonates having a high percentage of units derived from 1,1-bis(4-hydroxy-3-methylphenyl)cyclohexane (DMBPC) in particular have excellent attributes such as ammonia resistance, resistance to scratching, and water vapor and oxygen impermeability compared to other polycarbonates. At least in part because of these good barrier properties, such polycarbonates are useful in medical packaging applications. However, such polycarbonates are also brittle (of low ductility) compared to polycarbonates containing a high number of units derived from bisphenols such as bisphenol A.

There accordingly remains a need in the art for polycarbonates that have improved ductility. It would further be desirable for the polycarbonates to retain other advantageous properties, such as oxygen impermeability, water vapor impermeability, scratch resistance, and/or transparency.

SUMMARY OF THE INVENTION

The above-described and other deficiencies of the art are met by a polycarbonate copolymer comprising 90 to 100 mol % of units derived from a bisphenol of formula (1)

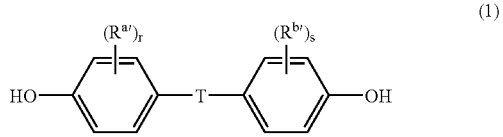

(1)

wherein $R^{a\prime}$ and $R^{b\prime}$ are each independently $C_{1-12}$ alkyl, T is a $C_{5-16}$ cycloalkylene, a $C_{5-16}$ cylcloalkylidene, a $C_{1-5}$ alkylene, a $C_{1-5}$ alkylidene, a $C_{6-13}$ arylene, a $C_{7-12}$ arylalkylene, $C_{7-12}$ arylalkylidene, a $C_{7-12}$ alkylarylene, or a $C_{7-12}$ arylenealkyl, and r and s are each independently 1 to 4;

2 to 35 wt % of units derived from a diol of formula (2a) or (2b),

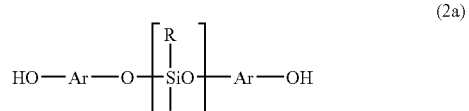

(2a)

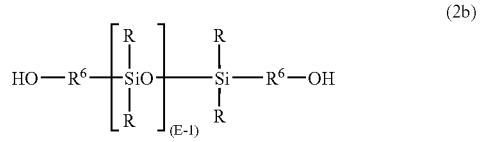

(2b)

or a combination of (2a) and (2b), wherein Ar is a substituted or unsubstituted $C_{6-36}$ arylene group, each R is the same or different $C_{1-13}$ monovalent organic group, each $R^{6}$ is the same or different divalent $C_{1}$-$C_{30}$ organic group, and E is an integer from 2 to 100; and 0 to 10 mol % of units derived from a dihydroxy aromatic compound of formula (3)

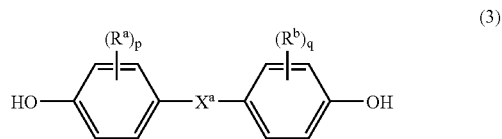

(3)

wherein $R^{a}$ and $R^{b}$ are each independently halogen, $X^{a}$ is a $C_{1-18}$ organic group, p and q are each independently integers of 0 to 4; wherein the dihydroxy aromatic compound of formula (3) is not the same as the bisphenol of formula (1); wherein each of the foregoing mole percents is based on the total moles of bisphenol of formula (1) and dihydroxy aromatic compound of formula (3) used to manufacture the polycarbonate copolymer, and the weight percent is based on the total weight of the bisphenol of formula (1), polysiloxane diols of formula (2a) and/or (2b), and dihydroxy aromatic compound of formula (3) used to manufacture the copolycarbonate.

In another embodiment, a method of manufacture of the above-described polycarbonate copolymer comprises combining the bisphenol of formula (1), the diols of formulas (2a) and/or (2b), and optionally the dihydroxy aromatic compound of formula (3) and 0 to 50% of the total amount of an end-capping agent in a biphasic solvent to provide a first reaction mixture; adding sufficient caustic to the first reaction mixture to achieve a pH of 8.0 to 9.0; reacting the pH-adjusted first reaction mixture with a carbonyl precursor in the presence of sufficient caustic to maintain a pH of 6.0 to 9.0, in the absence of any tertiary amine or phase transfer catalyst until 70 to 90% of the theoretical amount of carbonyl precursor required to react with all hydroxy groups is added, to provide a second reaction mixture; adding 50 to 100% of the total amount of the end-capping agent to the second reaction mixture to provide a third reaction mixture; reacting the third reaction mixture with a carbonyl precursor in the presence of sufficient caustic to maintain a pH of 6.0 to 9.0 until 80 to 99% of the theoretical amount of carbonyl precursor required to react with all phenol groups has been delivered, to provide a fourth reaction mixture; adding a tertiary amine catalyst to the fourth reaction mixture; and continuing the reaction in the presence of sufficient caustic to maintain a pH of 10 to 11.

In another embodiment, a method of manufacture of a thermoplastic composition comprises blending the above-described polycarbonate copolymer with an additive to form a thermoplastic composition.

In yet another embodiment, an article comprises the above-described polycarbonate copolymer.

In still another embodiment, a method of manufacture of an article comprises molding, extruding, or shaping the above-described polycarbonate copolymer into an article.

The above described and other features are exemplified by the following detailed description.

DETAILED DESCRIPTION OF THE INVENTION

Described herein is a polycarbonate copolymer (also referred to herein as a "copolycarbonate") derived from at least 90 mol % of a cyclohexylidene-bridged, alkyl-substituted bisphenol, and less than 10 mol % of another bisphenolor resorcinol-type monomer. The copolymer further comprises a relatively high weight percent of units derived from a polysiloxane-containing diol. These copolymers have improved ductility, as well as other advantageous properties, such as transparency. The copolycarbonates are particularly useful in medical applications. It has been found that manufacture of these polymers requires use of a process that omits the presence of a phase transfer salt in order to achieve high molecular weights and low polydispersities.

In particular, the copolycarbonates have repeating structural carbonate units of the formula (4):

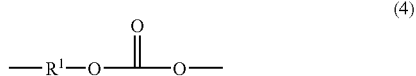

(4)

wherein the $R^1$ groups are derived from at least 90 mol % of a cyclohexylidene-bridged, alkyl-substituted bisphenol, and a polysiloxane-containing monomer. Accordingly, at least 90 mol % of the $R^1$ groups of formula (4) are derived from alkyl-substituted bisphenols of formula (1):

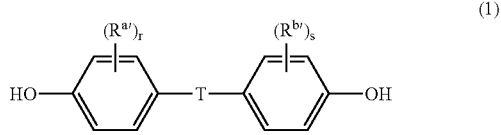

(1)

wherein $R^{a'}$ and $R^{b'}$ are each independently $C_{1-12}$ alkyl, T is a $C_{5-16}$ cycloalkylene, a $C_{5-16}$ cylcloalkylidene, a $C_{1-5}$ alkylene, a $C_{1-5}$ alkylidene, a $C_{6-13}$ arylene, a $C_{7-12}$ arylalkylene, $C_{7-12}$ arylalkylidene, a $C_{7-12}$ alkylarylene, or a $C_{7-12}$ arylenealkyl, and r and s are each independently 1 to 4. In an embodiment, where T is a $C_6$ cycloalkylidene, the $R^1$ groups are cycloalkylidene-bridged, alkyl-substituted bisphenols of formula (1a):

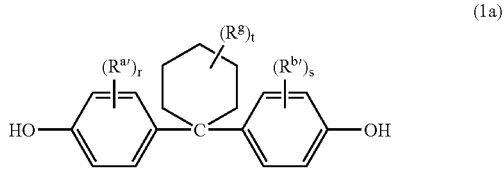

(1a)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. It will be understood that hydrogen fills each valency when r is 0, s is 0, and t is 0. In a specific embodiment, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In a specific embodiment, $R^{a'}$, $R^{b'}$, and $R^g$ are each $C_{1-4}$ alkyl, specifically methyl. In still another embodiment, $R^{a'}$, $R^{b'}$, and $R^g$ is a $C_{1-3}$ alkyl, specifically methyl, r and s are 1-2, and t is 0 to 5, specifically 0 to 3. Specifically, at least one of $R^{a'}$ and/or $R^{b'}$ are is methyl, and is disposed meta to the bridging group. In another embodiment, the cyclohexylidene-bridged, alkyl-substituted bisphenol is 1,1-bis(4-hydroxy-3-methylphenyl)cyclohexane ("DMBPC"). In another embodiment, cycloalkylene-bridged, alkyl-substituted bisphenol is the reaction product of two moles of cresol with one mole of a hydrogenated isophorone (1,1,3-trimethyl-3-cyclohexane-5-one).

The copolycarbonate further comprises polycarbonate units derived from a diol that contains diorganosiloxane (also referred to herein as "polysiloxane") blocks of formula (5):

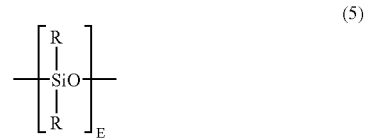

(5)

wherein each occurrence of R is same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-C14 aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an embodiment, where a transparent copolycarbonate is desired, R is unsubstituted by halogen. Combinations of the foregoing R groups can be used in the same copolycarbonate.

The value of E in formula (5) can vary widely depending on the type and relative amount of each of the different units in the copolycarbonate, the desired properties of the copolycarbonate, and like considerations. Generally, E can have an average value of 2 to 1,000, specifically 2 to 500. In an embodiment, E has an average value of 2 to 100, specifically 10 to 75. In another embodiment, for transparent compositions, E has an average value of 4 to 60, specifically 20 to 60, and more specifically 40 to 60. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

In one embodiment, the polysiloxane blocks are provided by repeating structural units of formula (6):

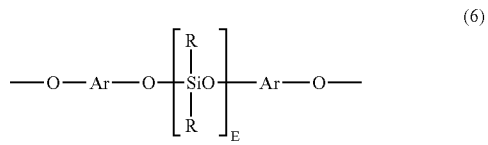

(6)

wherein E is as defined above; each R is the same or different, and is as defined above; and each Ar is the same or different, and is a substituted or unsubstituted $C_6$-$C_{30}$ arylene group, wherein the bonds are directly connected to an aromatic moiety. Ar groups in formula (6) can be derived from a $C_6$-$C_{30}$ dihydroxyarylene compound, for example a dihydroxyarylene compound of formula (3) or (12) described in detail below. Combinations comprising at least one of the foregoing dihydroxyarylene compounds can also be used. Exemplary dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), 1,1-bis(4-hydroxy-3-methylphenyl)cyclohexane, and 1,1-bis(4-hydroxy-t-butylphenyl)propane, or a combination comprising at least one of the foregoing dihydroxy compounds.

Polycarbonates comprising such units can be derived from the corresponding dihydroxy compound of formula (2a):

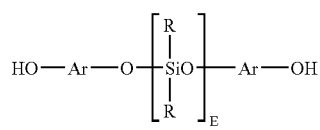
(2a)

wherein Ar and E are as described above. Compounds of formula (2a) can be obtained by the reaction of a dihydroxyarylene compound with, for example, an alpha, omega-bis-acetoxy-polydiorganosiloxane oligomer under phase transfer conditions. Compounds of formula (2a) can also be obtained from the condensation product of a dihydroxyarylene compound, with, for example, an alpha, omega bis-chloro-polydimethylsiloxane oligomer in the presence of an acid scavenger.

In another embodiment, polydiorganosiloxane blocks comprises units of formula (7):

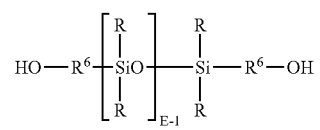
(7)

wherein R and E are as described above, and each $R^6$ is independently a divalent $C_1$-$C_{30}$ organic group, and wherein the oligomerized polysiloxane unit is the reaction residue of its corresponding dihydroxy compound. The polysiloxane blocks corresponding to formula (7) are derived from the corresponding dihydroxy compound (2b):

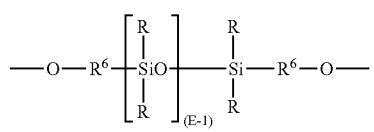
(2b)

wherein R and E and $R^6$ are as described for formula (7). In a specific embodiment, the polydiorganosiloxane blocks are provided by repeating structural units of formula (8):

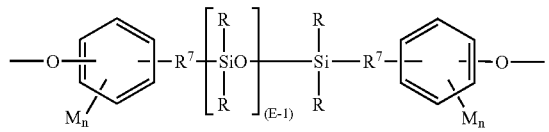
(8)

wherein R and E are as defined above. $R^7$ in formula (8) is a divalent $C_2$-$C_8$ aliphatic group. Each M in formula (8) can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^7$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^7$ is a divalent $C_1$-$C_3$ aliphatic group, and R is methyl.

Copolycarbonates comprising units of formula (8) can be derived from the corresponding dihydroxy polydiorganosiloxane (8a):

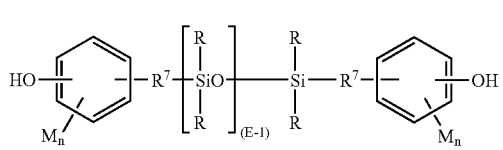
(8a)

wherein each of R, E, M, $R^7$, and n are as described above. Such dihydroxy polysiloxanes can be made by effecting a platinum-catalyzed addition between a siloxane hydride of formula (9):

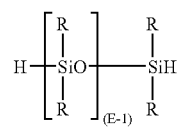
(9)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allyl phenol, and 2-allyl-4,6-dimethylphenol. Combinations comprising at least one of the foregoing can also be used.

The copolycarbonate can further optionally comprise a small amount of units derived from a bisphenol that differs from the bisphenol of formula (1), and, of course, the diol containing a polysiloxane. The bisphenol is of the formula (3):

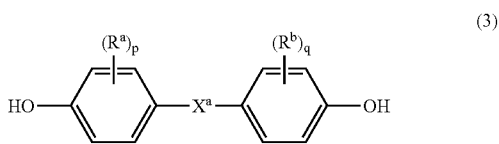
(3)

wherein $R^a$ and $R^b$ each represent halogen or $C_{1-12}$ alkyl group and can be the same or different; p and q are each independently integers of 0 to 4. It will be understood that when p and/or q is 0, the valency will be filled by a hydrogen atom. Also in formula (3), $X^a$ represents a bridging group connecting the two hydroxy-substituted aromatic groups (i.e., hydroxy-substituted $C_6$ arylene groups such as, for example, phenol or o-cresol), where the bridging group and the hydroxy substituent of the $C_6$ arylene group are disposed para to each other on the $C_6$ arylene group. In an embodiment, the bridging group $X^a$ is a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group.

In an embodiment, $X^a$ is one of the groups of formula (10):

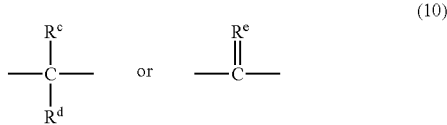

(10)

wherein $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylene group or a $C_{6-16}$ arylene group.

In still another embodiment, $X^a$ is an acyclic $C_{1-18}$ alkylidene group, a $C_{3-18}$ cycloalkylidene group (except for a cyclohexylidene), or a $C_{2-18}$ heterocycloalkylidene group, i.e., a cycloalkylidene group having up to three heteroatoms in the ring, wherein the heteroatoms include —O—, —S—, or —N(Z)-, where Z is hydrogen, halogen, hydroxy, $C_{1-12}$ alkyl, $C_{1-12}$ alkoxy, or $C_{1-12}$ acyl.

$X^a$ can be a substituted $C_{3-18}$ cycloalkylidene of the formula (11):

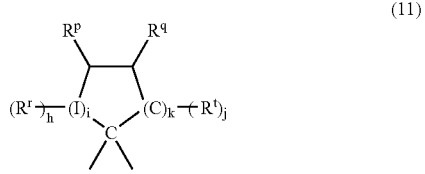

(11)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)- wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (11) will have an unsaturated carbon-carbon linkage where the ring is fused. When k is one and i is 0, the ring as shown in formula (11) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

Some illustrative, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (2) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one of the foregoing dihydroxy aromatic compounds can also be used.

Small amounts of other types of diols can be present in the copolycarbonate. For example, a small portion of $R^1$ can be derived from a dihydroxy aromatic compound of formula (12):

(12)

wherein each $R^f$ is independently $C_{1-12}$ alkyl, or halogen, and u is 0 to 4. It will be understood that $R^f$ is hydrogen when u is 0. Typically, the halogen can be chlorine or bromine. In an embodiment, compounds of formula (12) in which the —OH groups are substituted meta to one another, and wherein $R^f$ and u are as described above, are also generally referred to herein as resorcinols. Examples of compounds that can be represented by the formula (12) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

The relative amount of each type of units in the copolycarbonate will depend on the desired properties of the copolymer, and are readily ascertainable by one of ordinary skill in the art without undue experimentation, using the guidance provided herein. In general, the polycarbonate copolymer will comprise 90 to 100 mol %, specifically 95 to 100 mol %, even more specifically 99 to 100 mol % of units derived from the cyclohexylidene bisphenol of formula (1). The polycarbonate copolymer will further comprise 2 to 35 wt %, specifically 3 to 34 wt %, even more specifically 5 to 32 wt % of units derive from the diols of formulas (2a) and/or (2b). The polycarbonate will further comprise 0 to 10 mol %, specifically 0 to 5 mol %, even more specifically 0 to 1 mol % of units derived from the dihydroxy aromatic compound of formula (3). Each of the foregoing mole percents is based on the total moles of cyclohexylidene bisphenol of formula (1) and dihydroxy aromatic compound of formula (3) used to manufacture the copolycarbonate, and the weight percent is based on the total weight of the cyclohexylidene bisphenol of formula (1), polysiloxane diols of formula (2a) and/or (2b), and dihydroxy aromatic compound of formula (3) used to manufacture the copolycarbonate.

Other types of dihydroxy monomers, e.g., those of formula (12), can be used in small amounts of up to 10 mol %, specifically up to 7 mol %, and even more specifically, up to 5 mol %. In one embodiment, the copolycarbonate consists essentially of units derived from the cyclohexylidene bisphenol and the polysiloxane diols, that is, no other monomers are used that significantly adversely affect the desired properties of the copolycarbonate. In another embodiment, only monomers that fall within the scope of formulas (1) and (2a) and/or (2b), that is, the copolycarbonate consists of units derived from the cyclohexylidene bisphenol and the polysiloxane diols.

It has been found that particularly advantageous results are obtained when the polycarbonate copolymer is obtained using 90 to 100 mol %, specifically 95 to 100 mol %, of a monomer of formula (1) wherein $R^{a'}$ and $R^{b'}$ are each independently $C_{1-3}$ alkyl, specifically methyl, $R^g$ is $C_{1-3}$ alkyl, specifically methyl, r and s are each independently 1 to 2, specifically 1, and t is 0 to 5, specifically 0 or 3; 2 to 35 wt %, specifically 5 to 32 wt %, of a monomer of formula (2b) wherein each R is methyl, E is 10 to 75, each n is 0, and each $R^7$ is a $C_{2-8}$ alkylene, specifically a $C_{3-7}$ alkylene; and 0 to 10 mol %, specifically 0 to 5 mol % of a monomer of formula (3) wherein each $R^a$ and $R^b$ are independently a $C_{1-3}$ alkyl group, specifically methyl, p and q are each independently integers of 0 to 1, specifically 0, and $X^a$ is a $C_{1-5}$ alkylidene, specifically isopropylidene.

Polycarbonates are ordinarily manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst salt, under controlled pH conditions, e.g., about 8 to about 10.

The inventors hereof have found that copolycarbonates having improved properties, in particular ductility, are produced using a modified interfacial process that is carried out in the complete absence of a phase transfer catalyst salt, and wherein a catalyst such as an amine is only added late in the reaction process.

Accordingly, in the present process, the above-described hydroxy-containing monomers and a small amount of an end-capping agent (e.g., a monophenol) in a biphasic solution are treated sufficient caustic to achieve a pH of 8.0 to 9.0, then reacted with a carbonyl precursor (e.g., phosgene) in the presence of sufficient caustic to maintain a pH of 6.0 to 9.0, specifically 8.0 to 9.0, in the absence of any tertiary amine or phase transfer catalyst. As used herein, "in the absence of" means that less than 25 ppm, specifically less than 10 ppm, and more specifically less than 5 ppm of tertiary amine or phase transfer catalyst is present. Reaction is continued until 70 to 90, specifically 75 to 85% of the theoretical amount of carbonyl precursor required to react with all hydroxy groups is added.

The remaining amount of end-capping agent is then added, and reaction at a pH of 8.0 to 9.0 is continued until 80 to 99, specifically 85 to 95% of the theoretical amount of carbonyl precursor required to react with all phenol groups has been delivered. A tertiary amine catalyst (e.g., triethylamine) is then added, and reaction at a pH of 10 to 11 is continued until the absence of haloformates is observed, for example by testing with phosgene indicator paper. Completion of the reaction often requires a large excess of phosgene (>35% excess) over the theoretical amount of phosgene required to react with all phenol groups.

Omission of a phase transfer catalyst salt from the process (including contaminants that may be present in the reaction components or reactor) has been found to be important in achieving sufficient molecular weight. Such "phase transfer catalyst salts" include compounds of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, [CH$_3$(CH$_2$)$_3$]$_4$NX, [CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, and CH$_3$[CH$_3$(CH$_2$)$_2$]$_3$NX, wherein X is Cl$^-$, Br$^-$, a $C_{1-8}$ alkoxy group or a $C_{6-18}$ aryloxy group.

Other deviations from this procedure result in polymers with insufficient molecular weight characteristics for steam precipitation isolation or melt processing and/or polymers with a broad polydispersity. For example, the presence of a tertiary amine prior to addition of the final amount of the carbonyl precursor will result in low molecular weights and/or high polydispersity.

Exemplary carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. Preferably, the process uses phosgene as a carbonate precursor.

The water-immiscible solvent used to provide a biphasic solution include, for example, methylene chloride, 1,2-dichloroethane, chlorobenzene, toluene, and the like.

The end-capping agent (also referred to as a chain stopper) limits molecular weight growth rate, and so controls molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain stoppers are exemplified by phenol and $C_1$-$C_{22}$ alkyl-substituted phenols such as p-cumyl-phenol, resorcinol monobenzoate, and p-tert-butyl phenol, cresol, and monoethers of diphenols, such as p-methoxyphenol. Alkyl-substituted phenols with branched chain alkyl substituents having 8 to 9 carbon atom can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Suitable monocarboxylic acid chlorides include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are monochloroformates including monocyclic monochloroformates, such as phenyl chloroformate, $C_1$-$C_{22}$ alkyl-substituted phenyl chloroformate, p-cumyl phenyl chloroformate, toluene chloroformate, and combinations thereof.

Various types of polycarbonates with branching groups are contemplated as being useful, provided that such branching does not significantly adversely affect desired properties of the compositions. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

The polycarbonates can have a weight average molecular weight of about 10,000 to about 200,000, specifically about 15,000 to about 100,000 as measured by gel permeation chromatography (GPC), using a crosslinked styrene-divinylbenzene column and calibrated to polycarbonate references. GPC samples are prepared in a solvent such as methylene chloride or chloroform at a concentration of about 1 mg/ml, and are eluted at a flow rate of about 1.5 ml/min.

The copolycarbonates can further have a melt volume ratio (MVR) of about 1 to about 80, more specifically about 2 to about 40 $cm^3$/10 minutes, measured at 300° C. under a load of 1.2 kg according to ASTM D1238-04.

The copolycarbonates can further have a Notched Izod Impact (NII) strength of about 0.09 to about 2 foot-pounds per inch, (ft-lb)/inch (i.e., about 5 to 100 Joules per meter, J/m), measured at 23° C. using 3.2 mm thick bars in accordance with ASTM D256-04.

The copolycarbonates can further have a Dynatup total energy of about 4 to about 40 Joules (J), measured at 23° C. using circular 10 cm disks with 3.2 mm thickness, in accordance with ASTM D3763-02.

The copolycarbonates can further have an averaged Dynatup ductility from 0 to 100%, as determined using a statistically significant number of samples having a thickness of 3.2 mm and consisting essentially of the copolycarbonate, measured at 23° C. in accordance with ASTM D3763-02.

The copolycarbonates can further be manufactured to be substantially transparent. In this case, the polycarbonate compositions can have a transparency of 0.5 to 10%, as measured using 3.2 mm plaques according to ASTM-D1003-00. Alternatively, or in addition, the copolycarbonates can have a haze of 0.5 to 5% as measured using 3.2 mm thick plaques according to ASTM-D1003-00.

In addition to the copolycarbonates described above, combinations of the polycarbonate with other thermoplastic polymers, for example homopolycarbonates, other polycarbonate copolymers comprising different $R^1$ moieties in the carbonate units, polyester carbonates, also known as a polyester-polycarbonates, and polyesters. These combinations can comprise 1 to 99 wt %, specifically 10 to 90, more specifically 20 to 80 wt % of the copolycarbonate terpolymer, with the remainder of the compositions being other polymers and/or additives as described below.

For example, the thermoplastic composition can further include an impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers, materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers are generally present in amounts of 1 to 30 wt %, based on the total weight of the polymers in the composition.

In addition to the copolycarbonate, the thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of about 1 to about 20 parts by weight, based on 100 parts by weight of copolycarbonate and impact modifier.

Exemplary antioxidant additives include, for example, organophosphites such as tris(nonyl phenyl)phosphite, tris(2, 4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 0.1 parts by weight, based on 100 parts by weight of copolycarbonate and impact modifier.

Exemplary heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 0.1 parts by weight, based on 100 parts by weight of copolycarbonate and impact modifier.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tertoctylphenyl)-benzotriazole and 2-hydroxy-4-n-octoxy benzophenone, or the like, or combinations comprising at least one of the foregoing light stabilizers. Light stabilizers are generally used in amounts of about 0.01 to about 5 parts by weight, based on 100 parts by weight of copolycarbonate and impact modifier.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl] propane (UVINUL® 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to about 100 nanometers; or the like, or combinations comprising at least one of the foregoing UV absorbers. UV absorbers are generally used in amounts of about 0.01 to about 5 parts by weight, based on 100 parts by weight of copolycarbonate and impact modifier.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol)copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of about 0.1 to about 1 parts by weight, based on 100 parts by weight of copolycarbonate and impact modifier.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide(polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of about 0.05 to about 0.5 parts by weight, based on 100 parts by weight of copolycarbonate and impact modifier.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of about 0.001 to about 3 parts by weight, based on 100 parts by weight of copolycarbonate and impact modifier.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p- quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of about 0.0001 to about 5 parts by weight, based on 100 parts by weight of copolycarbonate and impact modifier.

Where a foam is desired, useful blowing agents include for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. Blowing agents are generally used in amounts of about 1 to about 20 parts by weight, based on 100 parts by weight of copolycarbonate and impact modifier.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl) phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

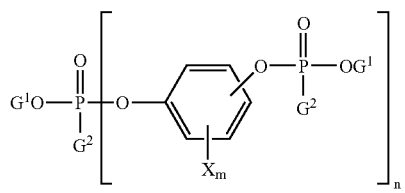

-continued

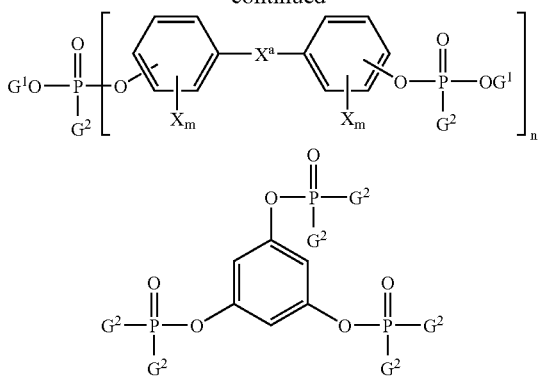

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants are generally present in amounts of about 0.1 to about 30 parts by weight, more specifically about 1 to about 20 parts by weight, based on 100 parts by weight of copolycarbonate and impact modifier.

Halogenated materials can also be used as flame retardants, for example halogenated compounds and resins of formula (13):

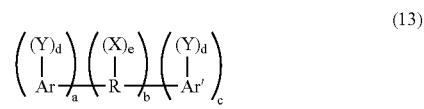

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (13) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are generally present in amounts of about 1 to about 25 parts by weight, more specifically about 2 to about 20 parts by weight, based on 100 parts by weight of copolycarbonate and impact modifier.

Alternatively, the thermoplastic composition can be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of the composition, excluding any filler.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 0.01 to about 10 parts by weight, more specifically about 0.02 to about 1 parts by weight, based on 100 parts by weight of copolycarbonate and impact modifier.

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise about 50 wt % PTFE and about 50 wt % SAN, based on the total weight of the encapsulated fluoropolymer. The SAN can comprise, for example, about 75 wt % styrene and about 25 wt % acrylonitrile based on the total weight of the copolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer. Antidrip agents are generally used in amounts of 0.1 to 10 percent by weight, based on 100 percent by weight of copolycarbonate and impact modifier.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^4$HOH or —CR$_2^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.05 to 1 parts by weight based on 100 parts by weight of copolycarbonate and impact modifier.

The thermoplastic composition comprising the copolycarbonate can have desirable properties. In an embodiment, an article having a thickness of 3.2 mm and molded from the thermoplastic composition has a NII strength of 20 to 100 Joules per meter (J/m), measured at 23° C. in accordance with ASTM D256-04. In another embodiment, an article having a thickness of 3.2 mm and molded from the thermoplastic composition has a haze of less than 10%, measured in accordance with ASTM D1003-00. In another embodiment, an article having a thickness of 3.2 mm and molded from the thermoplastic composition has a Dynatup Ductility total energy of 4 to 40 Joules as measured by ASTM D3763-02.

Thermoplastic compositions comprising the copolycarbonate can be manufactured by various methods. For example, powdered copolycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Shaped, formed, or molded articles comprising the copolycarbonate compositions are also provided. The polycarbonate compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. In addition, the polycarbonate compositions can be used for medical applications, such as syringe barrels, sample containers, medicament containers, plastic vials, blood housings, filter housings, membrane housings, plungers, and the like.

The copolycarbonates are further illustrated by the following non-limiting examples.

Polycarbonate copolymers were made from monomers of Formulas (14) and (15):

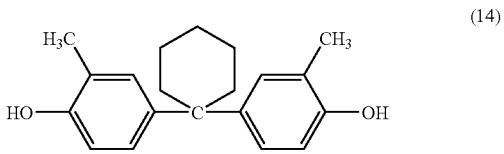

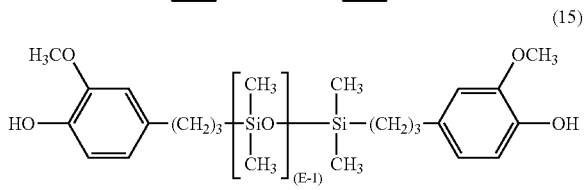

using the procedures below.

EXAMPLE 1

The following were added into a 80-L continuously stirred tank reactor (CSTR) equipped with an overhead condenser and a recirculation pump with a flow rate of 40 L/minute: cyclohexylidene bisphenol (Formula (14)) (4,400 g, 14.9 mol); methylene chloride (17 L); de-ionized water (12 L), para-cumyl phenol (PCP, 20 g, 0.09 mol) sodium gluconate (10 g); and 250 g of 50% aqueous sodium hydroxide. The mixture was charged with phosgene (3,150 g, 200 g/min, 31.8 mol). During the addition of phosgene, base (50 wt % NaOH in deionized water) was simultaneously charged to the reactor to maintain the pH of the reaction between 8 and 9. After the complete addition of phosgene, the reaction mixture was adjusted to a pH of 10, and the following were added to the reactor: Polysiloxane diol (Formula (15), where E is about 44) (670 g) and methylene chloride (2.3 L). The reaction mixture was stirred for 10 to 15 minutes at pH 11 to 13. Subsequently, phosgene (378 g, 200 g/min, 3.8 mol) was added, and the pH was maintained at 9 to 10 by the addition of 50% sodium hydroxide solution. Then, the following was added to the reactor: PCP (95 g, 0.45 mol); and methylene chloride (1 L). The mixture was charged with phosgene (336 g, 200 g/min, 3.4 mol). During the addition of phosgene, base (50 wt % NaOH in deionized water) was simultaneously charged to the reactor to maintain the pH of the reaction between 9 and 10. Subsequently, triethylamine (30 mL) and methylene chloride (1 L) was added to the reactor. The mixture was charged with phosgene (336 g, 200 g/min, 3.4 mol). After the complete addition of phosgene, the reaction mixture was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 24,150 g/mol (referenced to polycarbonate standards) and polydispersity index was 3.2.

EXAMPLE 2

The following were added into a 80 L CSTR equipped with an overhead condenser and a recirculation pump with a flow rate of 40 L/minute: Cyclohexylidene bisphenol (Formula (14)) (3,500 g, 11.8 mol); methylene chloride (17 L); de-ionized water (12 L), para-cumyl phenol (PCP, 20 g, 0.09 mol) sodium gluconate (10 g); and 250 g of 50% aqueous sodium hydroxide. The mixture was charged with phosgene (3150 g, 200 g/min, 31.8 mol). During the addition of phosgene, base (50 wt % NaOH in deionized water) was simultaneously charged to the reactor to maintain the pH of the reaction between 8 to 9. After the complete addition of phosgene, the reaction mixture was trimmed to a pH of 10, and the following were added to the reactor: Polysiloxane diol (Formula (15), where E is about 44) (1,200 g) and methylene chloride (2.3 L). The reaction mixture was stirred for 10-15 minutes at pH 11-13. Subsequently, phosgene (378 g, 200 g/min, 3.8 mol) was added, and the pH was maintained between 9 and 10 by the addition of 50% sodium hydroxide solution. Then, the following was added to the reactor: PCP (95 g, 0.45 mol); methylene chloride (1 L). The mixture was charged with phosgene (336 g, 200 g/min, 3.4 mol). During the addition of phosgene, base (50 wt % NaOH in deionized water) was simultaneously charged to the reactor to maintain the pH of the reaction between 9 and 10. Subsequently, triethylamine (30 mL) and methylene chloride (1 L) was added to the reactor. The mixture was charged with phosgene (336 g, 200 g/min, 3.4 mol). After the complete addition of phosgene, the reaction mixture was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 24,000 g/mol (referenced to polycarbonate standards) and polydispersity index was 3.2.

EXAMPLE 3

The following were added into a 80 L CSTR equipped with an overhead condenser and a recirculation pump with a flow rate of 40 L/minute: Cyclohexylidene bisphenol (Formula (14)) (2,800 g, 9.4 mol); methylene chloride (17 L); de-ionized water (12 L), para-cumyl phenol (PCP, 20 g, 0.09 mol) sodium gluconate (10 g); and 250 g of 50% aqueous sodium hydroxide. The mixture was charged with phosgene (3,150 g, 200 g/min, 31.8 mol). During the addition of phosgene, base (50 wt % NaOH in deionized water) was simultaneously charged to the reactor to maintain the pH of the reaction between 8-9. After the complete addition of phosgene, the reaction mixture was trimmed to a pH of 10, and the following were added to the reactor: Polysiloxane diol (Formula (15), where E is about 44) (1,700 g) and methylene chloride (0.5 L). The reaction mixture was stirred for 10 to 15 minutes at pH 11 to 13. Subsequently, phosgene (378 g, 200 g/min, 3.8 mol) was added, and the pH was maintained between 9 and 10 by the addition of 50% sodium hydroxide solution. Then, the following was added to the reactor: PCP (95 g, 0.45 mol); methylene chloride (0.25 L). The mixture was charged with phosgene (336 g, 200 g/min, 3.4 mol). During the addition of phosgene, base (50 wt % NaOH in deionized water) was simultaneously charged to the reactor to maintain the pH of the reaction between 9 and 10. Subsequently, triethylamine (30 mL) and methylene chloride (0.25 L) was added to the reactor. The mixture was charged with phosgene (336 g, 200 g/min, 3.4 mol). After the complete addition of phosgene, the reaction mixture was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate was measured to be 22,720 g/mol (referenced to polycarbonate standards) and polydispersity index was 2.5.

Samples of the copolycarbonates of Examples 1 to 3 were injection molded and tested in accordance with the test methods set forth above. The properties are shown in Table 1.

Further in Table 1, the relative mole percent (mol %) of units derived from the monomer of Formula (14) was calculated from the moles of monomer of Formula (14) charged into the reactor divided by the sum of the moles of monomer of Formula (14) and any other non-polysiloxane monomer charged to the reactor. The wt % of units derived from the monomer of Formula (15) was calculated from the weight of the monomer of Formula (15) charged to the reactor divided by the sum of the weights of the monomers of Formula (14), any other non-polysiloxane monomer, monomer of Formula (15), and para-cumyl phenol charged to the reactor.

TABLE 1

| | Monomer (14) (mol %) | Monomer (15) (wt %) | % Haze (3.2 mm) | NI Impact Strength (J/m$^2$) | Tg (° C.) | Dynatup Total Energy | 23° C. Dynatup Ductility (%) |
|---|---|---|---|---|---|---|---|
| Ex. 1 | 100 | 12.9 | 3 | 23 | 140 | 4 | 0 |
| Ex. 2 | 100 | 24.9 | 3 | 31 | 134 | 35 | 0 |
| Ex. 3 | 100 | 36.8 | 3 | 90 | 104 | 27 | 100 |

The data in Table 1 indicate that transparent copolymers can be synthesized using the methods outlined in the examples above. Additionally, samples having high ductility can be produced when greater than 30 wt % of the polysiloxane diol of Formula (15) is used in the composition. With other bisphenols, such as BPA, ductility begins to improve with the addition of about 2 to 3 wt % of polysiloxane units; with the copolycarbonates herein, a much larger amount of polysiloxane can be used to improve the ductility.

EXAMPLES 4 TO 10

Thermoplastic compositions comprising the copolycarbonates of Examples 1 and 2 above were prepared using the following additional components.

TABLE 2

| Name | Description | Manufacturer |
|---|---|---|
| PC | Bisphenol A polycarbonate, Mw = 30,000 g.mol | GE Plastics |
| PC-Si | Bisphenol A polycarbonate-polysiloxane copolymer, Mw = 23,000 g/mol (6 wt % Si) | GE Plastics |
| PETS | Pentaerythritol tetrastearate (plasticizer/mold release agent) | FACI (Farasco-Genova Italy) |
| I-168 | Tris(2,6-di-tert-butylphenyl)phosphite) (Antioxidant) | Ciba Specialty Chemicals |

Examples 4 to 10 were formulated with a mixture of the above resins, 0.3 phr PETS, and 0.06 phr I-168 and mixed in a Henschel™ tumbler for 5 to 10 minutes. Then, the formulations were extruded on a Wayne single screw extruder and pelletized. The pellets were injection molded into 3.2 mm thick parts for analysis. Table 3 shows the formulation of the compositions and their corresponding properties.

TABLE 3

| Example | Resin (wt %) | Resin (wt %) | Total Energy | % Ductility | % Haze |
|---|---|---|---|---|---|
| Ex. 4 | Ex. 1 (100) | — | 4 | 0 | 3 |

TABLE 3-continued

| Example | Resin (wt %) | Resin (wt %) | Total Energy | % Ductility | % Haze |
|---|---|---|---|---|---|
| Ex. 5 | Ex. 2 (100) | — | 35 | 0 | 3 |
| Ex. 6 | Ex. 2 (95) | PC-Si (5) | 31 | 40 | 9.8 |
| Ex. 7 | Ex. 2 (90) | PC-Si (10) | 35 | 60 | 3.5 |
| Ex. 8 | Ex. 1 (95) | PC-Si (5) | 5 | 0 | 1.6 |
| Ex. 9 | Ex. 1 (90) | PC-Si (10) | 31 | 0 | 1.7 |
| Ex. 10 | Ex. 1 (90) | PC (10) | 26 | 0 | 7.2 |

The above data in Table 3 shows that the ductility of samples with less than about 30 wt % polysiloxane units can be improved by blending them with additional polycarbonate containing bisphenol A and siloxane units. However, the haze of such blends is sometimes increased, and the ductility did not reach 100%.

The singular forms "a," "an," and "the" include plural referents unless the context clearly dictates otherwise. Unless defined otherwise, technical and scientific terms used herein have the same meaning as is commonly understood by one of skill in the art to which this invention belongs. The endpoints of all ranges directed to the same component or property are inclusive and independently combinable (e.g., ranges of "less than or equal to about 25 wt %, or, more specifically, about 5 wt % to about 20 wt %," is inclusive of the endpoints and all intermediate values of the ranges of "about 5 wt % to about 25 wt %," etc.). The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" refers broadly to a substituent comprising carbon and hydrogen, optional with at least one heteroatoms, for example, oxygen, nitrogen, halogen, or sulfur; "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A copolycarbonate comprising
90 to 100 mol % of units derived from a cycloalkylidene-bridged alkyl-substituted bisphenol of the formula

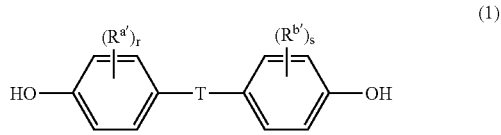

wherein $R^{a'}$ and $R^{b'}$ are each independently $C_{1-12}$ alkyl, T is a $C_{5-16}$ cycloalkylene, or a $C_{5-16}$ cylcloalkylidene, and r and s are each independently 1 to 4;

2 to 35 wt % of units derived from a polysiloxane diol of the formulas

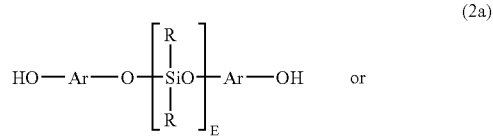

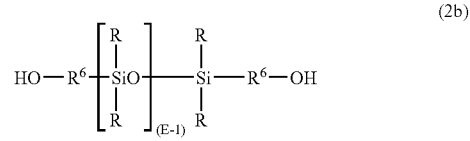

or a combination thereof, wherein Ar is a substituted or unsubstituted $C_{6-36}$ arylene group, each R is the same or different $C_{1-13}$ monovalent organic group, each $R^6$ is the same or different divalent $C_1$-$C_{30}$ organic group, and E is an integer from 40 to 60; and 0 to 10 mol % of units derived from a dihydroxy aromatic compound of formula

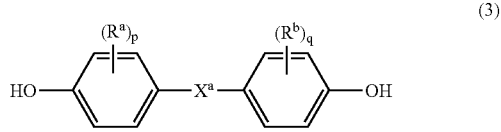

wherein $R^a$ and $R^b$ are each independently halogen or $C_{1-12}$ alkyl group, $X^a$ is a $C_{1-18}$ organic group, p and q are each independently integers of 0 to 4, and the dihydroxy aromatic compound is not the same as the cycloalkylidene-bridged bisphenol or the polysiloxane diols; and wherein each of the foregoing mole percents is based on the total moles of bisphenol of formula (1) and dihydroxy aromatic compound of formula (3) used to manufacture the copolycarbonate, and the weight percent is based on the total weight of the bisphenol of formula (1), polysiloxane diols of formula (2a) and/or (2b), and dihydroxy aromatic compound of formula (3) used to manufacture the copolycarbonate.

2. The copolycarbonate of claim 1, wherein the cycloalkylidene-bridged alkyl-substituted bisphenol (1) is a cyclohexylidene bisphenol of the formula:

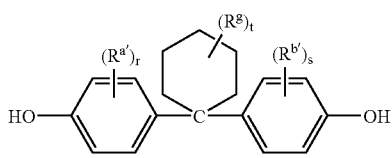

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10.

3. The copolycarbonate of claim 1, wherein the copolycarbonate is derived from a composition that consists essentially of the cycloalkylidene-bridged alkyl-substituted bisphenol and at least one of the polysiloxane diols.

4. The copolycarbonate of claim 2, wherein the copolycarbonate is derived from a composition that consists of the cyclohexylidene bisphenol and at least one of the polysiloxane diols.

5. The copolycarbonate of claim 2, wherein $R^{a'}$ and $R^{b'}$ are each independently $C_{1-4}$ alkyl, $R^g$ is $C_{1-4}$ alkyl, r and s are each independently 1 to 2, and t is 0 to 5, and $R^{a'}$ and $R^{b'}$ are each disposed meta to the cycloalkylidene bridge.

6. The copolycarbonate claim 1, wherein Ar is a substituted or unsubstituted $C_{6-12}$ arylene group, and each R is the same $C_{1-4}$ alkyl group.

7. The copolycarbonate of claim 1, wherein the polysiloxane diol is of the formula:

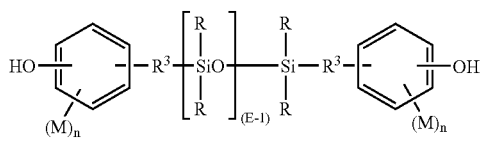

wherein E has an average value of 2 to 100, each R is a $C_{1-3}$ alkyl group, each $R^3$ is independently a divalent $C_{2-8}$ aliphatic group, each M is the same or different and is a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, and each n is independently 0 to 4.

8. The copolycarbonate of claim 7, wherein M is bromo, chloro, a $C_{1-3}$ alkyl group, a $C_{1-3}$ alkoxy group, phenyl, chlorophenyl, or tolyl; $R^3$ is a dimethylene, trimethylene or tetramethylene group; and R is a $C_{1-8}$ alkyl, trifluoropropyl, cyanoalkyl, phenyl, chlorophenyl or tolyl.

9. The copolycarbonate of claim 7, wherein R is methyl, a combination of methyl and trifluoropropyl, or a combination of methyl and phenyl; M is methoxy, n is one, and $R^3$ is a divalent $C_1$-$C_3$ aliphatic group.

10. The copolycarbonate of claim 1, wherein p is 0 to 1, and $X^a$ is

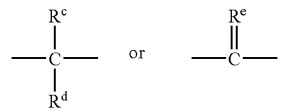

wherein $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group.

11. The copolycarbonate of claim 10, wherein p is 0 and $R^c$ and $R^d$ are each independently $C_{1-3}$ alkyl.

12. A copolycarbonate comprising
95 to 100 mol % of units derived from a cyclohexylidene bisphenol of the formula

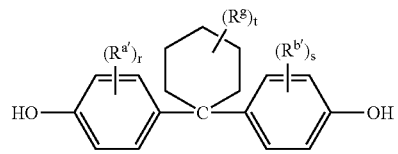

wherein $R^{a'}$ and $R^{b'}$ are each independently $C_{1-3}$ alkyl, $R^g$ is $C_{1-3}$ alkyl or halogen, r and s are each independently 1 to 2, and t is 0 to 5;
10 to 35 wt % of units derived from a polysiloxane diol of the formulas

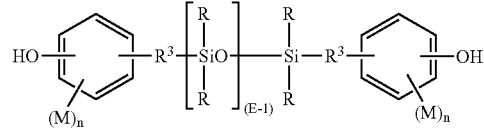

wherein each R is the same or different $C_{1-13}$ monovalent organic group, each $R^3$ is the same or different divalent $C_1$-$C_8$ aliphatic group, M is bromo, chloro, a $C_{1-3}$ alkyl group, a $C_{1-3}$ alkoxy group, phenyl, chlorophenyl, or tolyl, and E is an integer from 40 to 60; , and n is independently 0 to 4; and
0 to 5 mol % of units derived from a dihydroxy aromatic compound of formula

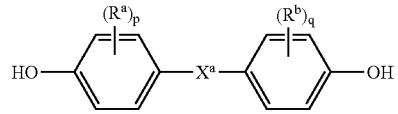

wherein $R^a$ and $R^b$ are each independently halogen, $X^a$ is a $C_{1-18}$ alkylene group, a $C_{3-18}$ cycloalkylene group, or a fused $C_{6-18}$ cycloalkylene group p and q are each independently integers of 0 to 1, and the dihydroxy aromatic compound is not the same as the cyclohexylidene bisphenol or the polysiloxane diols.

13. The copolycarbonate of claim 12, wherein $R^{a'}$ and $R^{b'}$ are each methyl and each disposed meta to the cycloalkylidene bridge, r and s are each 1, t is 0, R is methyl, a combination of methyl and trifluoropropyl, or a combination of methyl and phenyl, M is methoxy, n is one, $R^3$ is a divalent $C_1$-$C_3$ aliphatic group, p and q are 0, and $X^a$ is isopropylidene.

14. A method of manufacture of a polycarbonate copolymer, comprising
combining the components of claim 1 and 0 to 50% of the total amount of an end-capping agent in a biphasic solvent to provide a first reaction mixture;
adding sufficient caustic to the first combination to achieve a pH of 8.0 to 9.0;
reacting the pH-adjusted first reaction mixture with a carbonyl precursor in the presence of sufficient caustic to maintain a pH of 6.0 to 9.0, in the absence of any tertiary amine or phase transfer catalyst until 70 to 90% of the theoretical amount of carbonyl precursor required to react with all hydroxy groups is added, to provide a second reaction mixture;
adding 50 to 100% of the total amount of the end-capping agent to the second reaction mixture to provide a third reaction mixture; reacting the third reaction mixture with a carbonyl precursor in the presence of sufficient caustic to maintain a pH of 6.0 to 9.0 until 80 to 99% of the theoretical amount of carbonyl precursor required to react with all phenol groups has been delivered, to provide a fourth reaction mixture;
adding a tertiary amine catalyst to the fourth reaction mixture; and continuing the reaction in the presence of sufficient caustic to maintain a pH of 10 to 11.

15. The method of claim 14, wherein additional amounts of a carbonyl precursor are added at pH 10 to 11 until the Mw of the polymer does not increase further.

16. A thermoplastic composition, comprising the copolycarbonate of claim 1 and an additive.

17. The thermoplastic composition of claim 16, further comprising an additive, wherein the additive is an impact modifier, a filler, an ionizing radiation stabilizer, an antioxidant, a heat stabilizer, a light stabilizer, an ultraviolet light absorber, a plasticizer, a lubricant, a mold release agent, an antistatic agent, a pigment, a dye, a flame retardant, an antidrip agent, or a combination comprising at least one of the foregoing additives.

18. The thermoplastic composition of claim 16, wherein an article having a thickness of 3.2 mm and molded from the thermoplastic composition has a NII strength of 20 to 100 Joules per meter (J/m), measured at 23° C. in accordance with ASTM D256-04.

19. The thermoplastic composition of claim 16, wherein an article having a thickness of 3.2±0.12 mm and molded from the thermoplastic composition has a haze of less than 10%, measured in accordance with ASTM D1003-00.

20. The thermoplastic composition of claim 16, wherein an article having a thickness of 3.2 mm and molded from the thermoplastic composition has a Dynatup Ductility total energy of 4 to 40 Joules as measured by ASTM D3763-02.

21. A method of manufacture of a thermoplastic composition, comprising blending the copolycarbonate of claim 1 with a polycarbonate or a polycarbonate polysiloxane copolymer to form a thermoplastic composition.

22. A method of manufacture of a thermoplastic composition, comprising blending the copolycarbonate of claim 1 with an additive to form a thermoplastic composition.

23. An article, comprising the thermoplastic composition of claim 16.

24. The article of claim 23, in the form of a syringe barrel, sample container, medicament containers, plastic vials, blood housings, filter housings, membrane housings, and plungers.

25. A method of manufacture of an article, comprising molding, extruding, or shaping the thermoplastic composition of claim 15 into an article.

26. The copolycarbonate of claim 1, further comprising 0 to 10 mol % of units derived from a dihydroxy aromatic compound of formula (12):

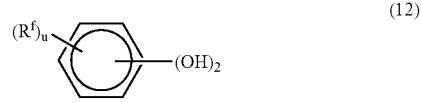

(12)

wherein each $R^f$ is independently $C_{1-12}$ alkyl, or halogen, and u is 0 to 4.

* * * * *